G. W. WILLIS.
GRAIN BINDER.
APPLICATION FILED NOV. 4, 1911.
1,026,841.
Patented May 21, 1912.
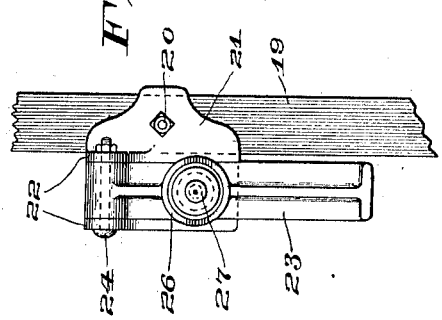
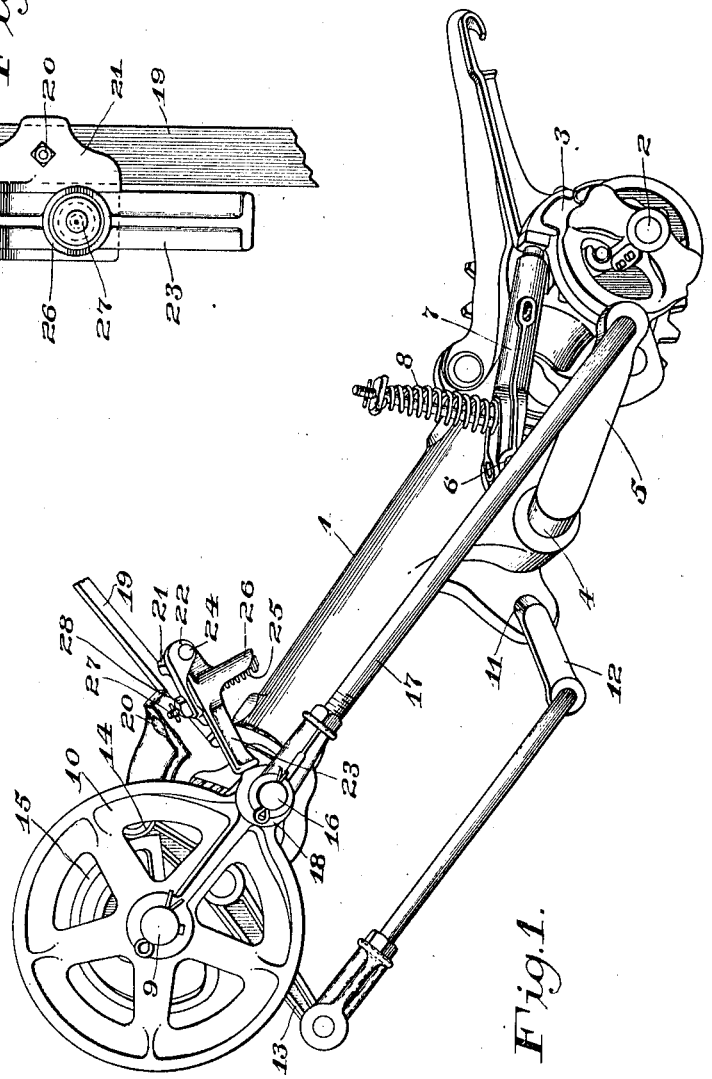
Witnesses:
C. C. Palmer
F. W. Hoffmeister
Inventor:
George W. Willis.
By E. W. Burges
Attorney.

UNITED STATES PATENT OFFICE.

GEORGE W. WILLIS, OF AUBURN, NEW YORK, ASSIGNOR TO INTERNATIONAL HARVESTER COMPANY, A CORPORATION OF NEW JERSEY.

GRAIN-BINDER.

1,026,841.    Specification of Letters Patent.    Patented May 21, 1912.

Application filed November 4, 1911. Serial No. 658,468.

*To all whom it may concern:*

Be it known that I, GEORGE W. WILLIS, a citizen of the United States, residing at Auburn, in the county of Cayuga and State of New York, have invented certain new and useful Improvements in Grain-Binders, of which the following is a specification.

My invention relates to grain binders, and in particular to the stop dog mechanism as applied to the cam gear for the purpose of preventing a retrograde movement thereof after it has completed its cycle of movement in the operation of binding a bundle. The object of my invention being to provide a mechanism simple in construction, readily adjusted for the desired purpose, and shielded from contact with the incoming grain. These objects are attained by means of the mechanism illustrated by the accompanying drawing, in which—

Figure 1 represents an end elevation in perspective, of part of a grain binder attachment for a harvester having my invention embodied in its construction; Fig. 2 is a bottom plan view on an enlarged scale, of the stop dog mechanism.

The same reference characters designate like parts throughout the several views.

1 represents the frame of the binder, 2 the packer shaft having a common form of clutch mechanism, 3, secured to its outer end whereby the other operative parts of the mechanism may be periodically operated in the well known way.

4 represents the needle shaft having crank arm 5 integral therewith; 6 the binder tripping shaft, having the clutch tripping arm 7 secured thereto, and 8 represents the usual compression spring operative to gage the pressure required to raise the tripping arm in a manner to release the clutch mechanism.

9 represents the knotter actuating shaft having a common form of combined gear and cam wheel 10 secured to its outer end.

11 represents the compressor shaft having a crank arm 12 integral therewith, the crank arm being connected with the outer end of a compressor lever 13 pivotally connected intermediate its ends with the frame of the binder, and having a roller 14 journaled upon the opposite end of the lever and engaging with the cam track 15 integral with gear wheel 10.

16 represents a crank pin secured to wheel 10 and 17 a pitman rod connecting the pin with the crank arm 5 of the needle shaft. A boss 18 integral with the wheel 10 receives the crank pin 16, the periphery of the boss being in the form of a cam.

19 represents a binder frame member secured to frame 1 by means of a bolt 20.

21 represents a bracket secured to frame member 19 by means of the bolt 20 and having depending ear portions 22 spaced apart in a manner to receive between them the end of a stop dog 23 that is pivotally connected therewith by means of a cross pin 24, the opposite end of the lever being adapted to contact with the cam surface upon the boss 18 in a manner to cause the wheel 10 to move under pressure of the dog at the end of its operative movement, the pressure of the dog thereon being regulated by means of a coiled compression spring 25 partially inclosed by a depending barrel portion 26 open upon one side and forming a shield for the spring against the incoming grain, the tension of the spring being regulated by means of a bolt 27 surrounded by the spring and having its upper end received by an opening in the supporting bracket, and provided with an adjusting nut 28.

The gear connections between the clutch mechanism on the packer shaft and the wheel 10 upon the knotter actuating shaft is not shown, as they may follow any of the well known forms, it being sufficient to describe the operation of the stop dog in connection with the knotter and needle operating mechanism.

What I claim as my invention and desire to secure by Letters Patent, is:

1. A grain binder including in combination, a binder frame, a knotter and needle actuating gear wheel rotatably mounted upon said frame, a bracket secured to said frame, and provided with depending ear portions spaced apart, a stop dog having one end received between said ears and pivotally connected therewith, the opposite end of said dog engaging with said gear wheel; a compression spring carried by said dog and operative in a manner to yieldingly hold the latter in engagement with said gear wheel, and a depending shield integral with said dog and operative in a manner to shield said spring against incoming grain.

2. A grain binder including in combination, a binder frame, a needle shaft, a knotter and needle actuating gear wheel, rotatably mounted upon said frame and having a crank pin thereon whereby it is connected with said needle shaft, a boss portion integral with said wheel and having said pin secured thereto; a cam forming part of the periphery of said boss, a bracket secured to said frame and provided with depending ears spaced apart, a stop dog having one end received between said ears and pivotally connected therewith, the opposite end of said dog engaging with said boss, a compression spring carried by said dog and operative in a manner to yieldingly hold the latter in engagement with said boss, and a depending shield integral with said dog and operative in a manner to shield said spring against the incoming grain.

GEORGE W. WILLIS.

Witnesses:
K. T. ELLIOTT,
H. S. WYLLIE.

Copies of this patent may be obtained for five cents each, by addressing the "Commissioner of Patents, Washington, D. C."